May 31, 1938. W. E. REIMER 2,119,353
JIGSAW
Filed July 20, 1936 2 Sheets-Sheet 2
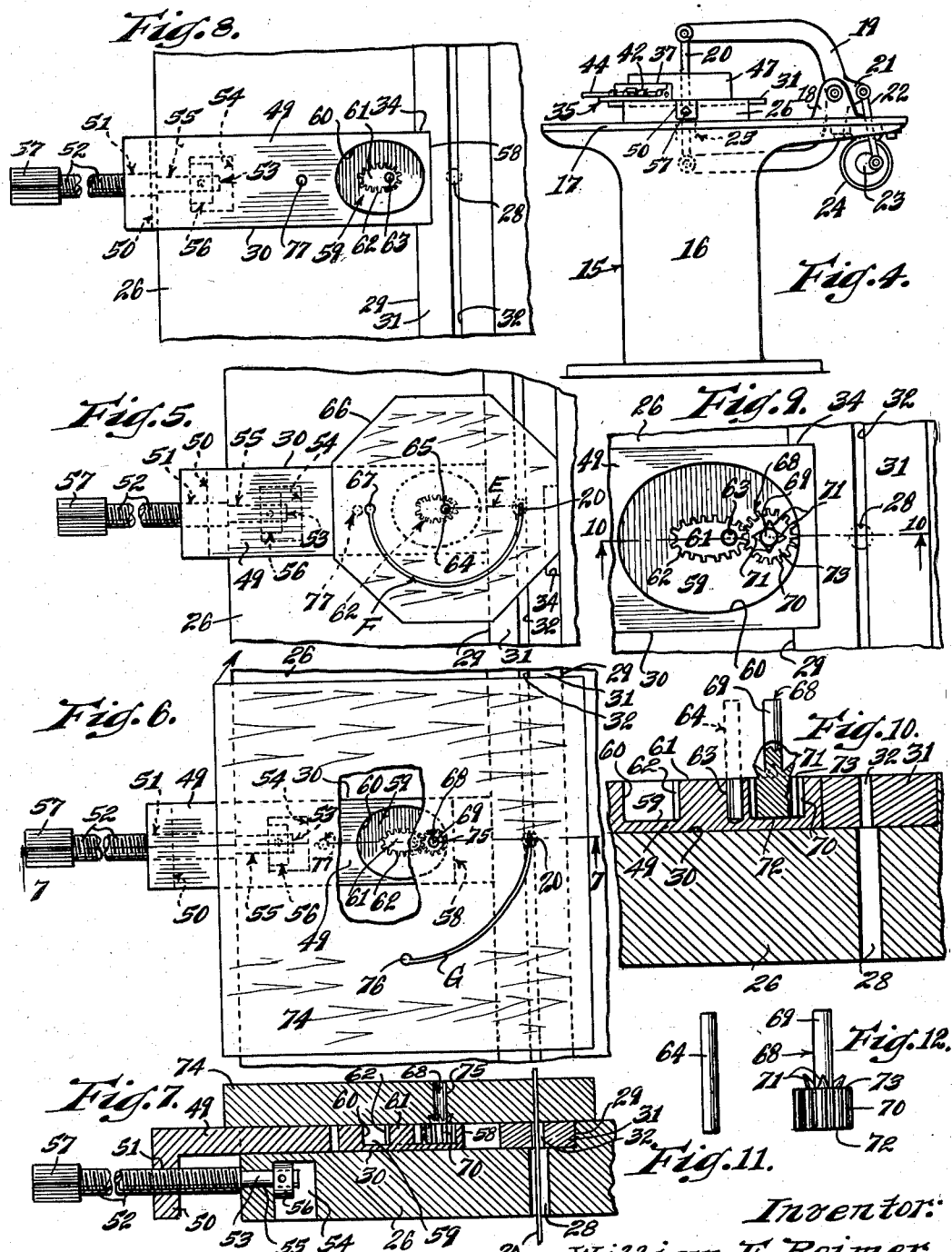
Inventor:
William E. Reimer,
By Joshua R. H. Potts
his Attorney.

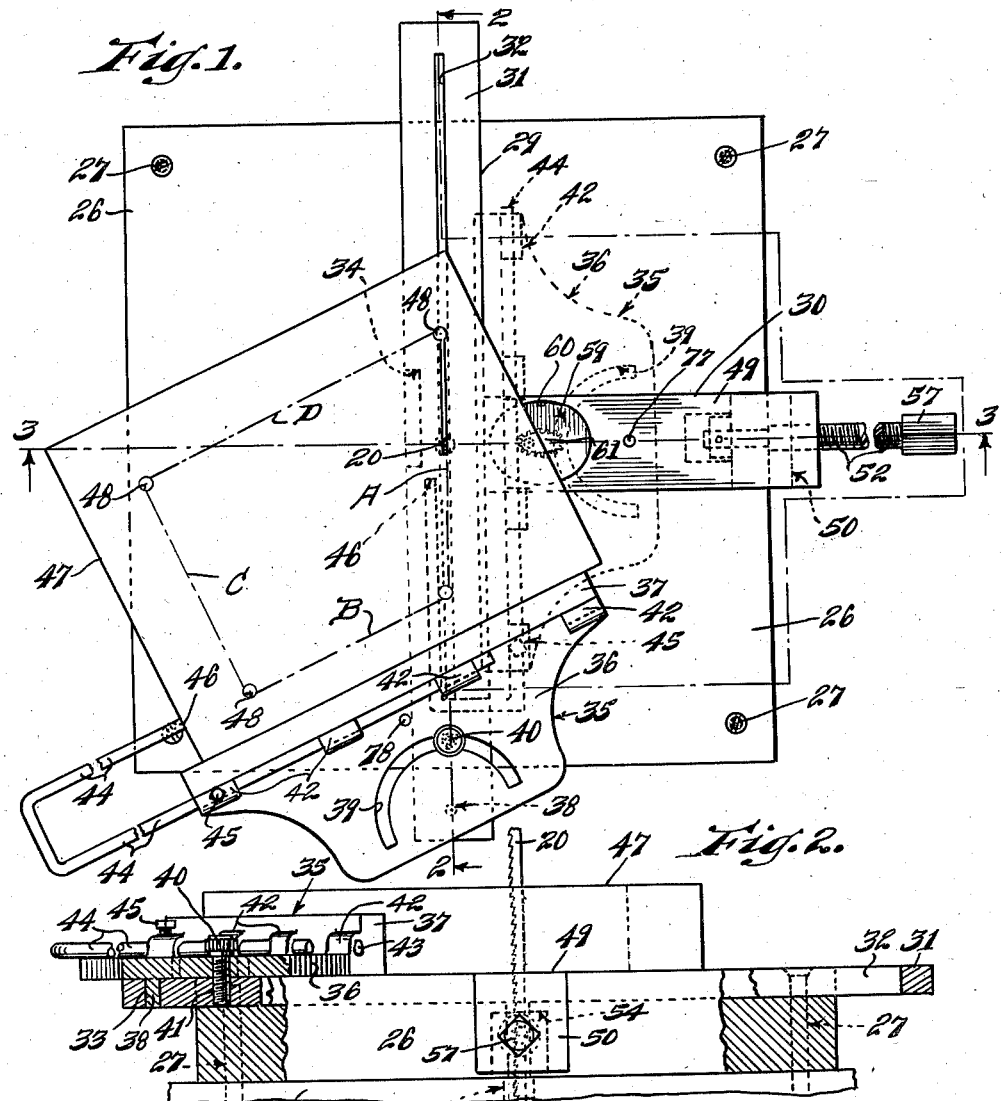

Patented May 31, 1938

2,119,353

UNITED STATES PATENT OFFICE 2,119,353

JIGSAW

William E. Reimer, Forest Park, Ill., assignor of one-half to Simon E. Hoh, Forest Park, Ill.

Application July 20, 1936, Serial No. 91,501

4 Claims. (Cl. 143—171)

This invention relates to jig saws and more particularly to adjustable gauge tables or templates for use in connection therewith.

An object of the invention is to provide a simple, practical, and efficient device of the character described.

Another object is to provide a device of the character described which is inexpensive to manufacture and adapted for a variety of uses.

Another object is to provide a gauge table for use with jig saws which possesses a high degree of accuracy.

A further object is to provide such a gauge table which is adjustable for both straight and curved work.

A further object is to provide such a gauge table adapted to perform uniform circular and oval work.

Still a further object is to provide such a gauge table adapted for producing a large amount of duplicated work which is uniform.

Other objects and advantages will appear and be brought out more fully in the following specification, reference being had to the accompanying drawings, wherein:

Fig. 1 is a plan view of an adjustable gauge table embodying my invention;

Fig. 2 is an elevation partly in section, taken along the line 2—2 of Fig. 1;

Fig. 3 is similarly taken along the line 3—3 of Fig. 1;

Fig. 4 is a side view of a jig saw showing my invention in connection therewith;

Fig. 5 is a fragmentary plan view showing the adjustable pivot member for use with circular work;

Fig. 6 is a fragmentary plan view illustrating the adjustable pivot member for use in making oval cuts;

Fig. 7 is a sectional view taken along the line 7—7 of Fig. 6;

Fig. 8 is a fragmentary plan view showing the adjustable pivot member adapted for small circular work;

Fig. 9 is an enlarged fragmentary view showing the pivot member and follower;

Fig. 10 is a sectional view taken along the line 10—10 of Fig. 9;

Figs. 11 and 12 are detailed views of the pin and follower respectively.

Referring more particularly to the drawings, and especially to Fig. 4, I show a typical jig saw 15, having the usual pedestal 16, table 17, bearing bracket 18 supporting a rock frame 19, which in turn carries a saw blade 20. The frame 19 is provided with a crank arm 21 which is connected by a link 22 to a rock arm 23 of a motor 24. The table 17 has an aperture 25 through which the saw blade 20 is adapted to reciprocate.

My invention comprises the parts about to be described, wherein, an adjustable gauge table 26 (Fig. 1) is provided and adapted to be secured as by set screws 27 to the table 17 of the jig saw 15, the table 26 being provided with a saw aperture 28 adapted to register with the aperture 25 of the jig saw table. A rectangular groove 29 is provided in and extends across the upper surface of the table 26. A similar groove 30 extends at right angles to the groove 29, the groove 30, however, extending only from one side of the groove 29 to an outer edge of the table 26. A reversible slide guide member 31 is adapted to be positioned in the groove 29 and has a central slot 32 extending substantially the length thereof. The member 31 is provided with a pin bearing aperture 33 and a rectangular recess 34 which is the same width as the groove 30. An adjustable gauge block 35 having a base member 36 and an abutment member 37 is pivotally secured by a pivot pin 38 to the slide guide member 31. Member 36 is provided with an arcuate slot 39 formed with the pivot pin 38 as a center, and a knurled thumb locking screw 40 is adapted to lock the gauge block 35 in any arcuate position in connection with a threaded aperture or tap hole 41 in the guide member 31. A plurality of bosses 42 are formed in the angle between the members 36 and 37 and are supplied with aligned apertures 43 in which one end of a U-shaped adjustable stop arm 44 can be passed and adjustably secured by a set screw 45, the arm 44 having a stop or abutment 46 at the free end thereof. A block 47 is shown as an example to illustrate the positioning of work on the table and is shown having a plurality of drilled holes 48 which define lines A, B, C, and D, along which it is desired to make cuts, it being understood that the saw blade 20 is readily detachable and inserted through one of the holes 48 for making the starting cut for any of the lines A, B, C, or D. It will be understood by those skilled in the art that if a large number of pieces are to be made similar to the block 47, the saw blade 20 may be removed after the cut along the line A has been made and another block substituted, it being clear that the block 47 is held firmly in position with respect to the gauge block 35 and stop 46, and that the same may be freely advanced along the saw line, the guide member 31 assuring a perfectly straight cut. For curved and circular work an adjustable pivot guide member 49 is provided substantially the width of the groove 30 and adapted to be moved inwardly and outwardly along the groove 30, as will be fully apparent hereinafter.

A lug 50 extends downwardly from the outer end of the guide member 49 and has a threaded aperture 51 which accommodates a threaded screw 52 which in turn has a reduced end portion 53 and a recess 54 cut in the under side of the table member 26. A bearing recess 55 is provided to accommodate a portion of the reduced end 53, and a locking collar 56 is secured to the end 53, as will be apparent from Fig. 3. The screw 52 has a square head 57 or other equivalent arrangement by which the screw may be suitably turned, the turning operation being such as to advance or withdraw the member 49 toward or away from the saw blade 20. The guide member 49 has an inner end face 58 which is adapted to extend into the recess 34 of the guide member 31 in order that the work attached to the guide member 49 may be brought as close as possible to the saw blade 20. An oval groove 59 is formed in the upper surface of the guide member 49 and has an outer wall 60 and an oval land portion 61, which land is formed with an oval gear track 62. A stud pin aperture 63 is formed in the land 61 and is adapted to receive a stud pin 64. A drilled hole 65 may be formed in a work block 66 by which the block may be secured to the stud pin 64. The work block is provided with the usual starting hole 67 suitably drilled for that purpose. (Fig. 5.)

It will be apparent from the foregoing that the block 66 may be rotated about the stud pin 64 and at a radius E a circular path F will be cut in the block 66. It will be clear that the radius E may be varied at will by the operation of the screw 52 which will advance or withdraw the member 49, carrying with it the center 64 in the stud pin aperture 63.

Figs. 6–10 illustrate the manner of forming oval cuts. A follower member 68 (Fig. 12) has a shank 69 and a circular gear portion 70 and is provided with a plurality of spurs 71, the gear portion having a lower face 72 and upper face 73 from which the spurs 71 are adapted to rise. A block 74 is shown having an oval cut, the block having a pivot aperture 75 adapted to receive the shank 69 of the follower 68, the block 74 having been secured thereto by forcing the spurs 71 into the block. A starting aperture 76 is shown for saw line G which is part of the oval cut being made. As the block 74 is advanced and the saw cut made, the block will be rotated and this rotation will cause the follower 68 to travel around the oval tooth track 62, resulting in an oval cut. Various size oval cuts can be made by the various positions of guide member 30 as in the case of circular cuts hereinbefore described.

An aperture 77 is provided in the member 49 by which the pivot pin 38 of the gauge block 35 may be secured to the guide member 49 if desired, for making the gauge block 35 parallel to the guide member 31 for parallel side cutting, as indicated by the dotted line position of the member 35 shown in Fig. 1. An aperture 78 is formed in the member 35 and is adapted to receive the pin 64 for the locking member 35 at right angles to the member 31 for straight cuts, as will be obvious.

From the foregoing it will be apparent that my invention is readily adaptable and will find an important use in the printing industry generally and especially adaptable for cutting out printers' dies, including blocks, spacers, and other forms, and also for use in electrotyping, photo engraving, and stereotype work.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A device of the character described comprising a table member adapted to be secured to a jig saw table, a gauge member adapted to guide a work piece during sawing, and means to adjustably secure said gauge member to said table member, said means including a groove in said table member and a bar slidable in said groove, said bar having an oval gear, a pinion and an adjustable pivot on said pinion adapted to engage a piece of work and move in an elliptical path when said work piece is advanced and sawed.

2. A device of the character described comprising a table member adapted to be secured to a jig saw table, a gauge member adapted to guide a work piece during sawing, and means to adjustably secure said gauge member to said table member, said means including a groove in said table member and a bar slidable in said groove, said bar having epicyclicly movable pivot means adapted to engage and move a piece of work in its epicyclic path.

3. A device of the character described comprising a table member adapted to be secured to a jig saw table, a gauge member adapted to guide a work piece during sawing, and means to adjustably secure said gauge member to said table member, said means including a groove in said table member and a bar slidable in said groove, said bar having an oval gear, a pinion and a movable pivot on said pinion adapted to engage a piece of work, said pivot adapted to move in a path which is a closed curve when said work piece is advanced and sawed.

4. A device of the character described comprising a table member adapted to be secured to a jig saw table, a gauge member, and means to adjustably secure said gauge member to said table member, said means including a groove in said table member and a bar slidable in said groove, said bar having movable pivot means adapted to engage a piece of work, said pivot having a gear secured thereto, said bar having an elliptical gear secured thereto adapted to engage said pivot gear whereby said work piece may be caused to traverse an elliptical path.

WILLIAM E. REIMER.